United States Patent Office 3,137,710
Patented June 16, 1964

3,137,710
METHOD FOR THE PREPARATION OF PRIMARY AMINES
Pietro de Ruggieri, Carmelo Gandolfi, and Domenico Chiaramonti, all of Milan, Italy, assignors to Ormonoterapia Richter S.p.A., Milan, Italy, a corporation of Italy
No Drawing. Filed July 12, 1961, Ser. No. 123,438
Claims priority, application Italy Mar. 30, 1961
7 Claims. (Cl. 260—397.5)

The object of this invention is to provide a novel method of general application for preparing aliphatic, alicyclic and araliphatic amines.

In accordance with this method, primary amines of the formula

wherein R is an aliphatic, alicyclic or araliphatic radical, are prepared by the reduction of alkoxy ethylidene-amino compounds of the formula

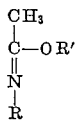

wherein R is an aliphatic, alicyclic or araliphatic radical and R' is an alkyl radical (preferably methyl or ethyl), by reduction with sodium amalgam or zinc amalgam in an acid medium. The alkoxy ethylidene-amino compounds are prepared by the Schmidt reaction (Organic Reactions, vol. III, p. 307 et seq.) in which methyl ketones of the formula

wherein R is an aliphatic, alicyclic or araliphatic radical, are reacted with hydrazoic acid in alcohol in the presence of gaseous HCl.

The method of the present invention may be carried out employing compounds which are subject to strong steric hinderance. For example, 16α- or 16β-methyl-17-(alkoxy-ethylidene-amino) androstanes may be readily reduced to 16α- or 16β-methyl-17-amino androstanes.

By employing the method of the present invention, it is possible to preserve other groups present in the molecule, such as acyloxy groups and alkyl and aryl amido groups. The use of zinc amalgam will, however, lead to the hydrolysis of acyloxy groups.

The following examples serve to illustrate the invention but they do not constitute a limitation thereof:

Example 1

Methylamine: 1 part of (1'-ethoxy-ethylidene-amino)-methane, prepared from acetone by the Schmidt reaction and having a boiling point of 99–100° C., was dissolved in 15 parts of 3 N HCl and treated for 3 hours at 5–10° C. with 16 parts of 3% sodium amalgam. The reaction mixture was decanted from the mercury, evaporated to dryness in vacuo and methylamine hydrochloride having a melting point of 226° C. was crystallized from alcohol-ether.

Example 2

Ethylamine: (1'-ethoxy-ethylidene-amino)-ethane, prepared from butane-2-one by the Schmidt reaction was treated by the procedure outlined in Example 1. The hydrochloride had a melting point of 108° C. and the base, freed with alkali, had a boiling point of 16.5° C.

Example 3

1 - amino-2-methyl-propane: 1-(1'-ethoxy-ethylidene-amino)-2-methyl propane, B.P. 145–147° C., prepared according to Schmidt from 4-methyl-pentane-2-one was treated as in Example 1. The base, freed by treatment with alkali, gave B.P. 67–69° C.

Example 4

1-amino-pentadecane: One part of 1-(1'-ethoxy-ethylidene-amino)-pentadecane, B.P. 163–165° C. at 5 mm./Hg, prepared according to Schmidt from heptadecane-2-one was dissolved in 5 parts of ethanol and 10 parts of 3 N HCl and there were added 4 parts of zinc amalgam prepared from 4 parts of zinc powder, 0.4 part of $HgCl_2$, 0.2 part of concentrated HCl and 8 parts of water, and subsequent decantation. The mixture was boiled at reflux for 4 hours adding each hour 1 part of concentrated HCl. The reaction mixture was decanted from the mercury, evaporated to dryness in vacuo and the crude hydrochloride was treated with alkali. The base freed in this manner was distilled in vacuo at 130–132° C. at 2 mm./Hg.

Example 5

Amino-cyclohexane: One part of (1'-methoxy-ethylidene-amino)-cyclohexane, prepared according to Schmidt from acetylcyclohexane and having a boiling point of 56–57° C. at 10 mm./Hg, was treated as in Example 4 to yield cyclohexylamine, B.P. 134° C. after the addition of alkali. The same product was obtained operating in like manner with (1'-ethoxy-ethylidene-amino)-cyclohexane, B.P. 61–63° C. at 7 mm./Hg.

Example 6

17β-amino-androst-5-ene-3β-ol: To one part of 17β (1'-ethoxy-ethylidene-amino)-androst-5-ene-3β-ol, B.P. 169–171° C. (prepared according to U.S. patent application Serial No. 75,091, filed December 12, 1960, now abandoned), dissolved in 30 parts of tetrahydrofurane and 20 parts of 3 N HCl was added at 5–10° C., 20 parts of 5% sodium amalgam. After stirring for 3 hours at 5–10° C., the reaction mixture was decanted from the mercury, and diluted with 100 parts of water. The precipitated product was filtered and crystallized from methanol. The free base was freed from the hydrochloride with NaOH to yield a product of B.P. 166–168° C. $[\alpha]_D =$ −54° (chloroform).

The same product was obtained using the 17β-(1'-methoxy - ethylidene - amino)-androst-5-ene-3β-ol, M.P. 166–169° C.; $[\alpha]_D = -25°$ (chloroform) prepared according to Schmidt from preg-5-nene-3β-ol-20-one.

Example 7

3β-acetoxy-17β-amino-androst - 5 - ene was prepared starting from 3β-acetoxy-17β-(1'-ethoxy-ethylidene-amino)androst-5-ene, M.P. 132–133° C. (see U.S. patent application Serial No. 75,091), in the same manner as Example 6, substituting for HCl, glacial acetic acid. Crystallized from methanol, M.P. 133–134° C. $[\alpha]_D = -74°$ (chloroform).

Example 8

17β-amino-5α-androstane-3β-ol was prepared starting from 17β-(1'-ethoxy-ethylidene-amino)-5α-androstane-3β-ol, M.P. 174–176° C. (see U.S. patent application Serial No. 75,091), in the same manner as Example 6. Crystallized from ethyl acetate, it gave M.P. 160–162° C.

Example 9

3β-acetoxy-17β-amino-5α-androstane was prepared starting from 3-acetoxy-17-(1'-ethoxy-ethylidene-amino)-5-androstane, M.P. 129–131° C. (see U.S. patent application Serial No. 75,091), in the same manner as Example 6. Crystallized from methanol; it melted 102–105° C.; [α]_D = −7.6° (chloroform).

*Example 10*

16α-methyl-17β-amino-5α-androstane-3β-ol: To zinc amalgam, prepared from 32 parts of zinc powder, 3.2 parts of HgCl$_2$, 1.6 parts of concentrated HCl and 64 of water, stirred for 5 minutes and decanted, were added, stirring so as to suspend it, 24 parts of water, 60 parts of tetrahydrofurane and 32 parts of concentrated HCl. Then 8 parts of 16α-methyl-17β-(1′-ethoxy-ethylidene-amino)-5α-androstane-3β-ol, M.P. 157–159° C. (see U.S. patent application Serial No. 75,091), dissolved in 120 parts of tetrahydrofurane and 8 parts of 4 N HCl were added while cooling the mixture to 5° C.

The mixture was then refluxed for 8 hours, adding 5 parts of concentrated HCl every hour. After cooling and making alkaline, the reaction mixture was extracted with chloroform and washed with water and the solvent was evaporated. The residue was crystallized from methanol to give 6.1 parts of 16α-methyl-17β-amino-5α-androstane-3β-ol; M.P. 161–163° C., [α]_D −10° (chloroform).

The same product is obtained using 16α-methyl-17β-(1′-methoxy-ethylidene-amino)-androst-5-ene-3β-ol, M.P. 155–158° C. [α]_D +18° (chloroform) prepared according to Schmidt from 16α-methyl-5α-pregnane-3β-ol-20-one.

*Example 11*

3β-acetoxy-16α-methyl-17β-amino-5α-androstane was prepared starting from the 3β-acetoxy-16α-methyl-17β-(1′-ethoxy-ethylidene-amino) compound, M.P. 155–157° C. (see U.S. patent application Serial No. 75,091), in the same manner as Example 6. Crystallized from methanol, it gave M.P. 135–137° C., [α]_D −15° (chloroform).

The same product was obtained using 3β-acetoxy-16α-methyl-17β-(1′-methoxy-ethylidene-amino)-androst-5-ene, M.P. 173–174° C., [α]_D +17° (chloroform) prepared according to Schmidt from 3β-acetoxy-16α-methyl-5α-pregnane-20-one.

*Example 12*

16α-methyl-17β-amino-androst-5-ene-3β-ol was prepared from 16α-methyl-17β-(1′-ethoxy-ethylidene-amino)-androst-5-ene-3β-ol, M.P. 174–176° C. (see U.S. patent application Serial No. 75,091), in the same manner as Example 10. Crystallized from methanol, it gave M.P. 168–171° C., [α]_D = −85° (chloroform).

*Example 13*

16β-methyl-17β-amino-androst-5-ene-3β-ol was prepared from 3β-acetoxy-16β-methyl-17β-(1′-ethoxy-ethylidene-amino)-androst-5-ene, M. P. 126–129° C. (see U.S. patent application Serial No. 75,091), in the same manner as Example 10. In this case there resulted the hydrolysis of the 3-acetoxy group to yield 16β-methyl-17β-amino-androst-5-ene-3β-ol, M.P. 194–196° C., [α]_D = −13° (chloroform).

*Example 14*

Benzylamine: one part of benzyl-(1′-ethoxy-ethylidene-amino) B.P. 108–110° C. at 17 mm./Hg, prepared from 2-propanone-1-phenyl by the Schmidt reaction, was dissolved in 10 parts of ethanol and 15 parts of 3 N sulfuric acid and treated at 5–10° C. with 20 parts of 5% sodium amalgam. After stirring for 3 hours, the reaction mixture was decanted from the mercury and made alkaline, separated from the aqueous layer and the benzylamine distilled at 185° C.

We claim:

1. In a method for the preparation of a primary amine, the step of reacting a compound selected from the group consisting of a 1′-alkoxy-ethylidene-amino-alkane, a 1′-alkoxy-ethylidene-amino-cycloalkane, a benzyl-(1′-alkoxy-ethylidene-amino) and a 17-(1′-alkoxy-ethylidene-amino)-steroid of the androstane series in which each of the alkoxy groups is a member selected from the group consisting of methoxy and ethoxy with a reducing agent selected from the group consisting of sodium amalgam and zinc amalgam in the presence of an acid.

2. A method as claimed in claim 1, wherein the acid is a strong acid selected from the group consisting of hydrochloric and sulphuric acids.

3. A method as claimed in claim 1, wherein the acid is acetic acid.

4. In a method for the preparation of primary alkyl amines, the step of reducing an alkoxy-ethylidene-amino derivative of the formula

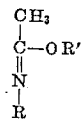

where R is an alkyl radical and R′ is a member selected from the group consisting of methyl and ethyl radicals with a reducing agent selected from the group consisting of sodium amalgam and zinc amalgam in the presence of an acid.

5. In a method for the preparation of amino-cyclohexane, the step of reducing a 1′-alkoxy-ethylidene-amino-cyclohexane in which the alkoxy group is a member selected from the group consisting of methoxy and ethoxy with a reducing agent selected from the group consisting of sodium amalgam and zinc amalgam in the presence of an acid.

6. In a method for the preparation of a 17-amino steroid of the androstane series, the step of reducing a 17-alkoxy-ethylidene-amino steroid of the androstane series in which the alkoxy group is a member selected from the group consisting of methoxy and ethoxy with a reducing agent selected from the group consisting of sodium amalgam and zinc amalgam in the presence of an acid.

7. In a method for the preparation of benzylamine, the step of reducing a benzyl-(1′-alkoxy-ethylidene-amino) in which the alkoxy group is a member selected from the group consisting of methoxy and ethoxy with a reducing agent selected from the group consisting of sodium amalgam and zinc amalgam in the presence of an acid.

References Cited in the file of this patent

UNITED STATES PATENTS 3,004,968    Jeger et al. _____ Oct. 17, 1961

OTHER REFERENCES

"An Outline of Organic Nitrogen Compounds" (Degering), published by University Lithoprinters (Michigan), 1945 (page 204 relied on).